Aug. 19, 1969 H. HENKER 3,461,836

EPITACTIC VAPOR COATING APPARATUS

Filed Dec. 28, 1965

United States Patent Office 3,461,836

Patented Aug. 19, 1969

3,461,836

EPITACTIC VAPOR COATING APPARATUS

Heinz Henker, Munich, Germany, assignor to Siemens Aktiengesellschaft, a corporation of Germany Filed Dec. 28, 1965, Ser. No. 516,913
Claims priority, application Germany, Dec. 29, 1964, S 94,856
Int. Cl. C23c *11/00*
U.S. Cl. 118—48 4 Claims

ABSTRACT OF THE DISCLOSURE

Described is apparatus for the simultaneous precipitation of crystalline semiconductor layers upon a plurality of disc-like crystalline substrates which are arranged in a reaction vessel on the surface of an elongated and heatable carrier which extends in a horizontal direction. A gas inlet tube with a row of openings at its lower side and rotatable about its horizontal axis is provided above the carrier and parallel to it. A gas outlet tube similar to the gas inlet tube and also provided with a row of openings, is situated below the carrier and also extends parallel to the carrier. Also described is the method of using the above apparatus.

Epitaxy is often used to produce semiconductor structural members. This is done by heating crystalline semiconductor wafers or platelets, especially monocrystals, to a high temperature below the melting point of the semiconductor material. Simultaneously, a flow of reaction gas is contacted with the wafers, which precipitates the respective semiconductor on the wafers, in a crystalline, particularly monocrystalline condition. The heating of the wafers is effected primarily by electrical means. For example, during the precipitation process, the wafers are kept in contact with a carrier and consist of a heat-resistant, inert, conducting material which is traversed by an electric current. Alternatively, the discs are heated to precipitation temperature by the direct action of an electromagnetic field, particularly an induction field or a radiation field.

In the interest of purity for the precipitated semiconductor, the reaction gas used consists of only volatile compounds in which the semiconductor and the dopant, when used are bonded to no element other than halogen and/or hydrogen. It is preferable to dilute the reaction gas with hydrogen. An inert gas is also sometimes used.

Sometimes different semiconductor materials are precipitated in crystalline, and even in a monocrystalline condition, upon substrates of another semiconductor material. This is possible, if the crystal lattice of the substrate and the epitactically precipitated layer are not very different from each other. With greater differences between the crystal characteristics, it may be possible to grow a monocrystalline body using a monocrystalline substrate, provided the transition between the two substances is gradual and not effected abruptly. It is also important, for the same reason, to be able to produce other crystalline materials, e.g. metals or insulating substances on a semiconductor disc, for the purpose of obtaining a semiconductor system with good qualities.

In the production of semiconductor structural components by means of epitaxy, it is necessary to produce epitactic layers of uniform layer thickness and crystal quality. Furthermore, it is desirable that the tangential component of the doping gradient disappear as identically as possible, in the precipitated layers. If several substrates are simultaneously subjected to a precipitation process in the same device, these requirements are placed upon all of the substrates. Obtaining this uniformity has presented difficulties. The present invention has as an object a solution to this difficult problem.

My invention concerns a method and apparatus for epitactic precipitation of a crystalline layer, particularly a semiconductor layer, on at least two semiconductor substrates not heated to the same temperature, and whose precipitation surfaces are of equal size, from a reaction gas suitable for pyrolytic precipitation of the material which forms the crystalline layer. According to my invention, the reaction chamber which receives the semiconductor substrates, is equipped with an inlet for the fresh reaction gas and an outlet for the consumed reaction gas. The fresh reaction gas is introduced in a manner whereby it flows across the precipitation area of the semiconductor bodies to be coated. According to my invention, the gas supply line at any point during the precipitation process supplies the semiconductor bodies to be coated, with variable amounts of fresh reaction gas. The gas supply is so changed during the entire precipitation process, that within each time interval necessary to precipitate a noticeable layer, the same amount of fresh reaction gas is supplied to each semiconductor body within the reaction chamber.

In order to produce epitactic layers simultaneously on several semiconductor crystals in one process, the crystals first must have the same temperature. This is satisfactorily obtained through known or previously suggested heating devices for epitaxy apparatus. Such devices make possible simultaneously heating a large number of semiconductor discs in such a way that the temperature of the individual discs deviates by maximum 1–2° C. from a median datum value of, for example, 1200° C.

However, the problem of supplying the individual discs with the same amount of fresh reaction gas, has not yet been adequately solved by the art. Contrary thereto, several semiconductor discs which were coated together in the same precipitation device, i.e. apparently under completely equal reaction conditions, show distinct inhomogeneity regarding the layer thickness, and the doping. This inhomogeneity must be caused by an irregular gas supply for the individual discs (wafers).

Experiments with a laminar flow of reaction gas, invariably led to irregular precipitation. For this reason, turbulence of the reaction gas had already been proposed in the interest of a uniform, monocrystalline semiconductor layer. See, for example, German Patent 1,048,638. But even a turbulent flow of the reaction gas is unable to ensure the required uniformity of the precipitated layers. The reason for this phenomena is found in the fact that often macroscopic turbulence cells develop in the gas flow. These turbulence cells find their way through the reaction chamber along unpredictable paths, which once established are stubbornly maintained during the precipitation process in spite of the fact that during another precipitation process, entirely different paths were followed by the turbulence cells. These processes lead to uneven coating of the individual substrate discs. They occur also during a constantly maintained gas supply, even at an apparently completely uniform gas supply.

My invention applies a defined irregular gas supply and changes the same so quickly, that even though the irregularity itself is maintained, due to an appropriate speed of operation, the semiconductor discs to be coated are affected in the same manner by the irregularity. Each disc thereby receives the same amount of fresh reaction gas for the individual discs. This will be made clear on hand of a preferred embodiment example.

Here, a movable nozzle emits the fresh reaction gas, e.g. as a stream. The fresh reaction gas prefers, first of all, the discs toward which the nozzle is accidentally directed over the other discs. If the nozzle, however, is rotated back and forth in an irregular or semi-regular manner, within the solid determined by the axis of the nozzle inlet into the reaction vessel and by the surface subtended by the discs to be coated, then all available discs may receive the fresh reaction gas in about the same way, without the opportunity of forming definite turbulence paths. The movement of the nozzle takes place along a path formed by the superimposition of the oscillation, for example, along a so-called Lissajou figure. In view of the fact that a fraction of a layer amounting to μm may already be established, and that precipitation velocities of 20 μ/min. are still absolutely suitable for epitaxial purposes, a considerable nozzle speed is sometimes required in order to provide the desired uniformity for the semiconductor layers produced on all discs. If necessary, a vibrating disc is then preferable.

In addition to this method, its kinematic reversal is also possible, i.e. a substrate moving with the discs and a stationary nozzle or a method whereby the nozzle moves as well as the discs.

The use of moving, stirring baffles in the path of fresh reaction gas is also favorable. This may eliminate the need for moving the discs or the gas supply nozzle. Several stationary or movable nozzles are supplied with fresh gas, at an equal frequency or in other defined time intervals and which are more or less inactive during each time interval required for precipitating an epitactic layer of marked thickness, whereby the formation of entrance paths for the turbulence cells are forestalled.

A variation of the last mentioned method for performing the invented method, may also be effected using only a single nozzle as a gas supply member. In this variation, the pressure under which the reaction gas flows from the nozzle, is either periodically or irregularly varied.

All these methods help to prevent or reduce the formation of pronounced, macroscopic turbulence cells and the paths thereof, so that the ideal case of uniform, i.e. only microscopic turbulence cells containing flow is approximated with good results. The same applies to the below-described method for performing the process according to the invention.

Figure 1:
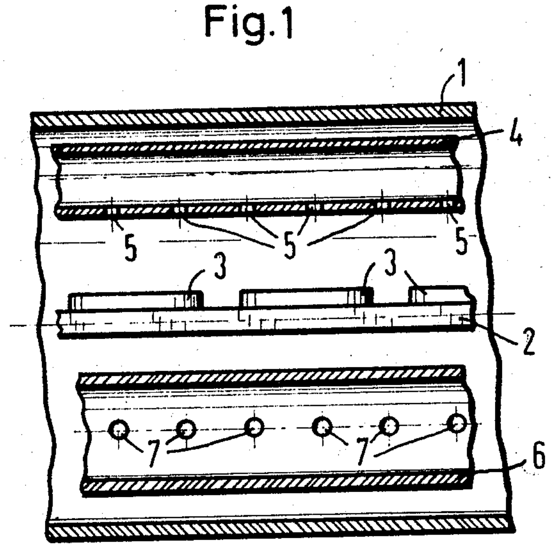
FIG. 1 is a sectional view of part of an apparatus for performing the method of the invention.

A horizontal, tube-shaped reaction vessel 1 of quartz contains therein an elongated heatable support 2 for the semiconductor discs 3 to be coated. The electrical connections for heating the support 2, or other heating means, e.g. induction or radiation means, have been omitted from the drawings since they are not directly connected with the invention. A gas supply pipe 4 is above the support 2 for the discs 3 to be coated, and extends longitudinally along the support 2. Outlet nozzles 5 are positioned equidistantly in the gas supply pipe along the housing line. A similar, somewhat larger pipe 6 with larger openings 7 is below the carrier 2 for removing the consumed reaction gas. If the upper pipe 4, if necessary also the lower pipe 6, is rotated back and forth around its longitudinal axis in a way whereby the gas jets emerging from the nozzles 5 pass over all the discs 3, then one obtains a uniform distribution of the fresh reaction gases over all the discs to be coated, insofar as that portion of the gas supply pipe 4, which is equipped with the nozzles 5 corresponds to the length of the portion of support 2, which is covered with the discs 3.

If necessary, a supply pipe provided with several rows of nozzles may be used in the interest of further uniformity. In addition, the pressure with which the fresh reaction gas flows into the reaction chamber may also be varied in order to obtain, during an average time, an improved uniformity of the flow of fresh gas across the semiconductor discs 3 to be coated.

Figure 2:
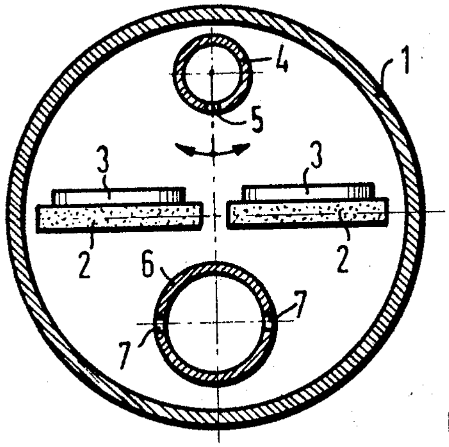
FIG. 2 is a cross section of the apparatus.
Figure 3:
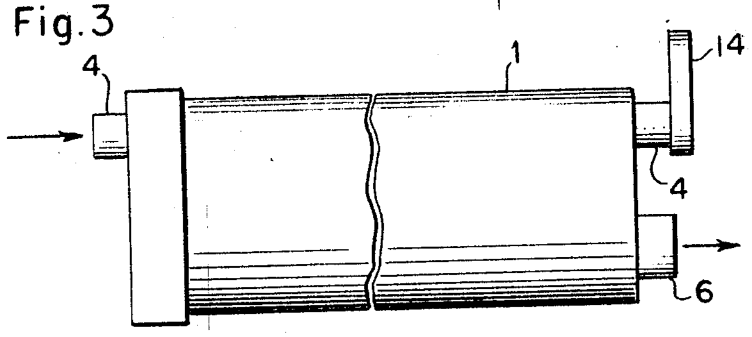
FIG. 3 shows a lateral elevation.

FIG. 3 shows, as stated above, a lateral view of the apparatus. The numerals, with the exception of 14, show features of FIGS. 1 and 2.

Figure 4:
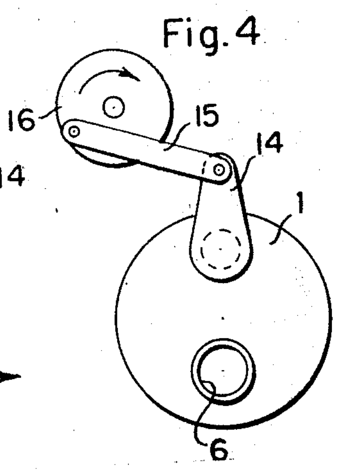
FIG. 4 is a view seen from the right of FIG. 3 and also shows schematically a reciprocating drive for one of the gas-inlet nozzle tubes of the apparatus.

At 14 is a portion of the mechanism for causing rotation of pipe 4. FIG. 4, the right hand view, shows a rotor 16, a connecting arm 15 eccentrically attached to said rotor 16 and a reciprocating cam connected to arm 15 to cause the rotation through a small arc of pipe 4.

The advantage of this construction lies, among other things, in the fact that only the relatively light supply pipe 4 needs to be turned or oscillated to obtain the desired improved uniformity.

I claim:

1. Apparatus for epitaxial precipitation of a crystalline layer upon a plurality of substrates having substantially equal precipitation-receiving surface areas, comprising a reaction vessel, a heatable support disposed in said vessel and having a top surface for accommodating and simultaneusly heating said substrates, gas supply means above said support and parallel thereto for passing a flow of thermally dissociable reaction gas through the vessel in contact with said substrate surface areas to precipitate the crystal-layer forming material from the gas onto said areas, said gas supply means comprising a nozzle tube having longitudinally sequential nozzle openings spaced from each other along the lower side of said nozzle tube for issuing respective jets of gas to supply at any moment of the precipitation process the respective substrates differently with fresh reaction gas, said gas supply means rotatable about its horizontal axis and means for moving said gas means about said axis for varying the differences in gas supply to said substrates for the entire duration of the precipitation process whereby all of said substrates are contacted with substantially the same quantity of fresh gas during said process duration, and an outlet tube provided with a row of openings, below said support and parallel thereto.

2. Apparatus according to claim 1, wherein there are two parallel supports, and the gas nozzle tube and the gas outlet tube are vertically superimposed upon each other and are situated above and beneath the space between the two supports, respectively.

3. Apparatus according to claim 1, wherein the gas outlet tube is rotatable about its axis.

4. Apparatus according to claim 2, wherein the gas outlet tube is rotatable about its axis.

References Cited

UNITED STATES PATENTS

| | | | |
|---|---|---|---|
| 2,576,289 | 11/1951 | Fink | 117—107.2 |
| 2,887,088 | 5/1959 | Nack | 117—107.2 X |
| 3,206,325 | 9/1965 | Auerbach | 118—49.5 X |
| 3,206,326 | 9/1965 | Whaley et al. | 117—107.2 |
| 3,208,888 | 9/1965 | Zeigler et al. | 148—175 |
| 3,233,578 | 2/1969 | Capita. | |
| 3,304,908 | 2/1967 | Gutsche et al. | 118—4.95 |
| 3,314,393 | 4/1967 | Haneta | 118—48 |
| 3,381,114 | 4/1968 | Nakamuri | 118—49.5 |

ALFRED L. LEVITT, Primary Examiner

A. GOLIAN, Assistant Examiner